(12) United States Patent
Sanderson et al.

(10) Patent No.: US 10,827,415 B2
(45) Date of Patent: Nov. 3, 2020

(54) NETWORK AWARENESS OF DEVICE LOCATION

(71) Applicant: Comcast Cable Communications, LLC, Philadelphia, PA (US)

(72) Inventors: Phillip Andrew Sanderson, Mount Laurel, NJ (US); Thomas William Lynn, Jr., Berryville, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/548,551

(22) Filed: Aug. 22, 2019

(65) Prior Publication Data

US 2020/0145903 A1    May 7, 2020

Related U.S. Application Data

(63) Continuation of application No. 15/811,416, filed on Nov. 13, 2017, now Pat. No. 10,448,312, which is a continuation of application No. 13/721,683, filed on Dec. 20, 2012, now Pat. No. 9,867,116.

(51) Int. Cl.
| | | |
|---|---|---|
| *H04W 40/36* | (2009.01) | |
| *H04W 36/08* | (2009.01) | |
| *H04L 12/64* | (2006.01) | |
| *H04W 8/06* | (2009.01) | |
| *H04L 29/12* | (2006.01) | |

(52) U.S. Cl.
CPC ......... *H04W 40/36* (2013.01); *H04L 12/6418* (2013.01); *H04W 8/06* (2013.01); *H04W 36/08* (2013.01); *H04L 61/2015* (2013.01); *H04L 61/6022* (2013.01)

(58) Field of Classification Search
CPC ...... H04W 40/36; H04W 36/08; H04W 48/20
See application file for complete search history.

(56) References Cited

U.S. PATENT DOCUMENTS

| | | |
|---|---|---|
| 7,512,381 B1 | 3/2009 | Sylvain |
| 9,867,116 B2 | 1/2018 | Sanderson et al. |
| 10,448,312 B2 | 10/2019 | Sanderson et al. |
| 2003/0212800 A1 | 11/2003 | Jones et al. |
| 2004/0117473 A1 | 6/2004 | Yamamura et al. |
| 2005/0030930 A1 | 2/2005 | Cho et al. |

(Continued)

FOREIGN PATENT DOCUMENTS

| | | |
|---|---|---|
| CA | 2837407 | 12/2013 |
| EP | 13198353 | 12/2013 |
| WO | WO-2006/128157 A2 | 11/2006 |
| WO | WO-2007/076147 A2 | 7/2007 |

OTHER PUBLICATIONS

Hanks et al., RFC 1701: Generic Routing Encapsulation (GRE), Oct. 1994, 8 pages.

(Continued)

*Primary Examiner* — Hoon J Chung
(74) *Attorney, Agent, or Firm* — Ballard Spahr LLP

(57) ABSTRACT

Systems and methods for managing a network are disclosed. One method can comprise detecting a triggering event at a node. Location information of the node can be transmitted to a routing device in response to the triggering event. Location information of the node can be transmitted to a management device. The management device can be configured to control an operation of one or more of the node and the routing device in response to the location information.

20 Claims, 7 Drawing Sheets

(56) References Cited

U.S. PATENT DOCUMENTS

| | | |
|---|---|---|
| 2007/0030826 A1 | 2/2007 | Zhang et al. |
| 2007/0153741 A1 | 7/2007 | Blanchette et al. |
| 2007/0238448 A1 | 10/2007 | Gallagher et al. |
| 2008/0165740 A1 | 7/2008 | Bachmann et al. |
| 2008/0205362 A1 | 8/2008 | Bedekar et al. |
| 2011/0032842 A1 | 2/2011 | Patil et al. |
| 2012/0259992 A1 | 10/2012 | Koehler et al. |
| 2013/0142182 A1 | 6/2013 | Gundavelli et al. |
| 2014/0177589 A1 | 6/2014 | Sanderson et al. |
| 2018/0295559 A1 | 10/2018 | Sanderson et al. |

OTHER PUBLICATIONS

Mancuso et al., Lecture 9. Direct Datagram Forwarding: Address Resolution Protocol (ARP), 2007-2008 (retrieval date of Aug. 18, 2012 from Internet Wayback Machine), 25 pages.

Microtik—EoIP Tunnel Interface, Mar. 9, 2004, 5 pages, https://mikrotik.com/testdocs/ros/2.8/interface/eoip.pdf.

Mikrotik Documentation—Manual:Interface/EoIP, Dec. 7, 2015, 4 pages, https://wiki.mikrotik.com/wiki/Manual:Interface/EoIP.

Plummer, RFC 826: An Ethernet Address Resolution PRotocol, Nov. 1982, 10 pages.

Rumy, User Authentication for Web Server Access, Oct. 11, 2011, CCNP Security, 12 pages, http://ccnpsecurity.blogspot.com/2011/10/user-authentication-for-web-server.html.

The TCP/IP Guide, http://www.tcpipguide.com/free/tARPMessageFormat.htm, retrieved on Jun. 20, 2017, 3 pages.

Extended European Search Report dated Feb. 24, 2014 by the European Patent Office for EP Application No. 13198353.8, which was filed on Dec. 19, 2013 and published as EP 2747342 on Jun. 25, 2014 (Applicant—Comcast Cable Communications, LLC) (pp. 1-8).

U.S. Appl. No. 13/721,683, filed Dec. 20, 2012, Phillip Andrew Sanderson.

U.S. Appl. No. 15/811,416, filed Nov. 13, 2017, Phillip Andrew Sanderson.

NETWORK AWARENESS OF DEVICE LOCATION

CROSS-REFERENCE TO RELATED APPLICATION

This application is a continuation of U.S. patent application Ser. No. 15/811,416, filed Nov. 13, 2017, which is a continuation of U.S. patent application Ser. No. 13/721,683 filed Dec. 20, 2012, issued as U.S. Pat. No. 9,867,116, which are hereby incorporated by reference in their entirety.

BACKGROUND

A network such as a wireless local area network can comprise one or more access points (AP) to provide a means for one or more user devices to communicate with and /or over the network. An access point can comprise a device that allows wireless user devices to connect to a wired network using Wi-Fi, Bluetooth, or related standards.

Often, a Media Access Control address (MAC address) is assigned to network interfaces, such as AP's, to facilitate addressable communications on a physical network segment. MAC addresses can be used for numerous network technologies, including most IEEE 802 network technologies, including Ethernet. Logically, MAC addresses can be used in the media access control protocol sub-layer of the open systems interconnection (OSI) reference model.

Currently, when a user device initially connects to a particular first AP of a network, the MAC address for the AP that the user device is connecting through is detected. The detected MAC address can be transmitted to a gateway of the network for addressing and referencing the user device on the network. However, when the user device roams to a second AP on the same network, the MAC address information of the second AP may not be detected or updated. Accordingly, improvements are needed for monitoring and locating devices connected or trying to connect to the network.

SUMMARY

It is to be understood that both the following general description and the following detailed description are exemplary and explanatory only and are not restrictive, as claimed. Provided are methods and systems for providing network services to one or more user devices or clients. The methods and systems described herein, in one aspect, can determine a location of one or more user devices connected to one or more access points of a network.

In an aspect, in the OSI reference model, a virtual layer 2 connection can be provided to facilitate the connectivity of one or more user devices and one or more access points of a network. In an aspect, an encapsulation of layer 2 frames over layer 3 networks enables an access point to act as a layer 2 bridge between two devices, such as between a client and a gateway. As an example, a user device can roam between the one or more access points to maintain connectivity to the same network. As a further example, the user device can have a persistent identifier or address associated therewith while connected to the network.

In an aspect, a layer 3 connection can be provided between one or more access points of the network to facilitate the transmission of location information to a gateway or router device of the network. As a further example, a Generic Routing Encapsulation (GRE) encapsulation can be used to transmit location information relating to one or more access points connected to the user device.

In an aspect, a network gateway device and/or upstream devices can receive the location information. As an example, the network gateway device can transmit the location information in authentication and accounting messages to a computing device such as an authentication, authorization and accounting (AAA) server. As a further example, the AAA server can store and/or update the location information in a network session state for the located user device when the user device moves between access points on the network. In an aspect, session schema can comprise date/time, calling station identifier, called station identifier, Internet Protocol (IP) Address IPV4/IPV6, account information, or other data points.

In an aspect, methods can comprise detecting a triggering event at a node of a network. As an example, location information relating to the node can be transmitted to a routing device such as a network gateway device in response to the triggering event. As a further example, the location information can be encapsulated for transmission such as by GRE encapsulation. The location information can be transmitted to a management device such as an AAA server. As an example, the management device can be configured to control an operation of one or more of the node and the routing device in response to the location information.

In another aspect, methods can comprise receiving first location information based upon a user communication with a first node of a network. Second location information can also be received based upon a user communication with a second node of the network. As an example, the second location information is received in an encapsulated format such as GRE encapsulation. As a further example, client location data can be stored and/or updated based on the second location information.

In a further aspect, a network can comprise a first node configured to communicate with a user device and transmit first location information to a routing device. The first location information can be transmitted in a first format. As an example, a second node of the network can be configured to communicate with the user device and transmit second location information to the routing device. The second location information can be transmitted in a second format. As a further example, the user device can be addressed by a persistent identifier when communicating with one or more of the first node and the second node.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
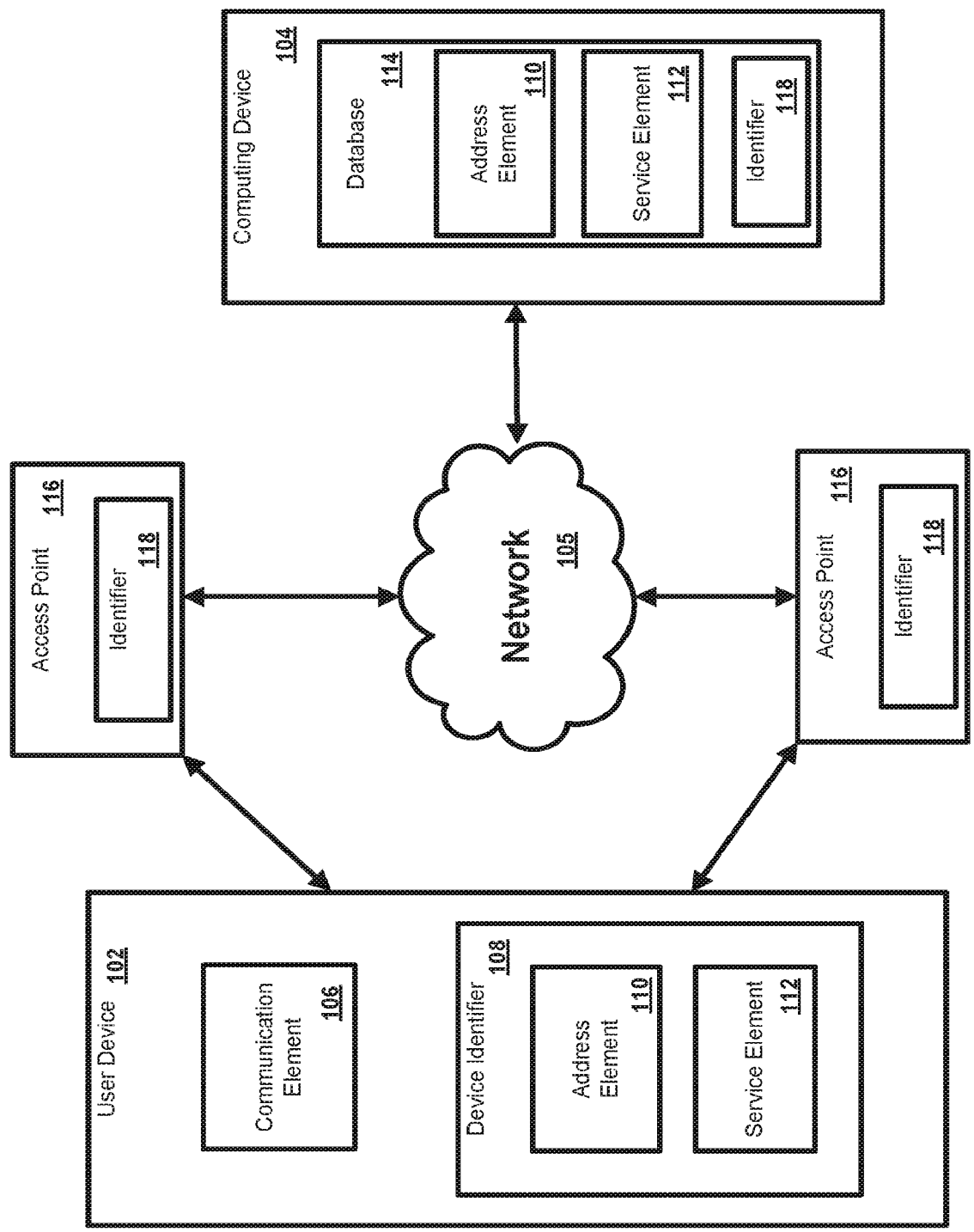
FIG. 1 is a block diagram of an exemplary system and network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

As described in greater detail below, in one aspect of the disclosure, a system can be configured to provide services such as provisioning service to a user device. FIG. 1 illustrates various aspects of an exemplary environment in which the present methods and systems can operate. The present disclosure is relevant to systems and methods for providing services to a user device, for example. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The network and system can comprise a user device 102 in communication with a computing device 104 such as a server, for example. The computing device 104 can be disposed locally or remotely relative to the user device 102. As an example, the user device 102 and the computing device 104 can be in communication via a private and/or public network 105 such as the Internet. Other forms of communications can be used such as wired and wireless telecommunication channels, for example.

In an aspect, the user device 102 can be an electronic device such as a computer, a smartphone, a laptop, a tablet, a set top box, a display device, or other device capable of communicating with the computing device 104. As an example, the user device 102 can comprise a communication element 106 for providing an interface to a user to interact with the user device 102 and/or the computing device 104. The communication element 106 can be any interface for presenting information to the user and receiving a user feedback such as a web browser (e.g., Internet Explorer, Mozilla Firefox, Google Chrome, Safari, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device such as the computing device 104.

In an aspect, the user device 102 can be associated with a user identifier or device identifier 108. As an example, the device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. As a further example, the device identifier 108 can comprise information relating to the user device such as a manufacturer, a model or type of device, a service provider associated with the user device 102, a state of the user device 102, a locator, and/or a label or classifier. Other information can be represented by the device identifier 108.

In an aspect, the device identifier 108 can comprise an address element 110 and a service element 112. In an aspect, the address element 110 can be an internet protocol address, a network address, an Internet address, or the like. As an example, the address element 110 can be relied upon to establish a communication session between the user device 102 and the computing device 104 or other devices and/or networks. As a further example, the address element 110 can be used as an identifier or locator of the user device 102. In an aspect, the address element 110 can be persistent for a particular network.

In an aspect, the service element 112 can comprise an identification of a service provider associated with the user device 102 and/or with the class of user device 102. As an example, the service element 112 can comprise information relating to or provided by a communication service provider (e.g., Internet service provider) that is providing or enabling communication services to the user device 102. As a further example, the service element 112 can comprise information relating to a preferred service provider for one or more particular services relating to the user device 102. In an aspect, the address element 110 can be used to identify or retrieve the service element 112, or vise versa. As a further example, one or more of the address element 110 and the service element 112 can be stored remotely from the user device 102 and retrieved by one or more devices such as the user device 102 and the computing device 104. Other information can be represented by the service element 112.

In an aspect, the computing device 104 can be a server for communicating with the user device 102. As an example, the computing device 104 can communicate with the user device 102 for providing services. In an aspect, the computing device 104 can allow the user device 102 to interact with remote resources such as data, devices, and files. As an example, the computing device can be configured as central location (e.g., a headend, or processing facility), which can receive content (e.g., data, input programming) from multiple sources. The computing device 104 can combine the content from the various sources and can distribute the content to user (e.g., subscriber) locations via a distribution system.

In an aspect, the computing device 104 can manage the communication between the user device 102 and a database 114 for sending and receiving data therebetween. As an example, the database 114 can store a plurality of files (e.g., web pages), user identifiers or records, or other information. As a further example, the user device 102 can request and/or retrieve a file from the database 114. In an aspect, the database 114 can store information relating to the user device 102 such as the address element 110 and/or the service element 112. As an example, the computing device 104 can obtain the device identifier 108 from the user device 102 and retrieve information from the database 114 such as the address element 110 and/or the service elements 112. As a further example, the computing device 104 can obtain the address element 110 from the user device 102 and can retrieve the service element 112 from the database 114, or vice versa. Any information can be stored in and retrieved from the database 114. The database 114 can be disposed remotely from the computing device 104 and accessed via direct or indirect connection. The database 114 can be integrated with the computing system 104 or some other device or system.

In an aspect, one or more access points 116 can be in communication with a network such as network 105. As an example, one or more of the access points 116 can facilitate the connection of a device, such as user device 102, to the network 105. As a further example, one or more of the access points 116 can be configured as a wireless access point (WAP). In an aspect, one or more access points 116 can be configured to allow one or more wireless devices to connect to a wired and/or wireless network using Wi-Fi, Bluetooth or similar standard.

In an aspect, the access points 116 can be configured as a mesh network. As an example, one or more access points 116 can comprise a dual band wireless access point. As an example, the access points 116 can be configured with a first service set identifier (SSID) (e.g., associated with a user network or private network) to function as a local network for a particular user or users. As a further example, the access points 116 can be configured with a second service set identifier (SSID) (e.g., associated with a public/community network or a hidden network) to function as a secondary network or redundant network for connected communication devices.

In an aspect, one or more access points 116 can comprise an identifier 118. As an example, one or more identifiers can be a media access control address (MAC address). As a further example, one or more identifiers 118 can be a unique identifier for facilitating communications on the physical network segment. In an aspect, each of the access points 116 can comprise a distinct identifier 118. As an example, the identifiers 118 can be associated with a physical location of the access points 116.

In an aspect, in the OSI reference model, a virtual layer 2 connection can be provided to facilitate the connectivity of one or more user devices 102 and one or more access points 116 of a network. In an aspect, an encapsulation of layer 2 frames over layer 3 networks enables one or more access points 116 to act as a layer 2 bridge between a client and a gateway. As an example, a user device 102 can roam between the one or more access points 106 to maintain connectivity to the same network. As a further example, the user device 102 can have a persistent identifier or address associated therewith while connected to the network.

In an aspect, a layer 3 connection can be provided between one or more access points 116 of the network to facilitate the transmission of location information to a gateway or router device of the network. As a further example, a Generic Routing Encapsulation (GRE) encapsulation can be used to transmit location information relating to one or more access points connected to the user device.

In an aspect, a network gateway device and/or upstream devices can receive the location information. As an example, the network gateway device can transmit the location information in authentication and accounting messages to an authentication, authorization and accounting (AAA) server. As a further example, the AAA server can store and/or update the information such as location information in a network session state schema for the located user device 102 when the user device 102 moves between access points 116 on the network. In an aspect, session state schema can comprise date/time, calling station identifier, called station identifier, Internet Protocol (IP) Address IPV4/IPV6, account information, or other data points.

Figure 2:
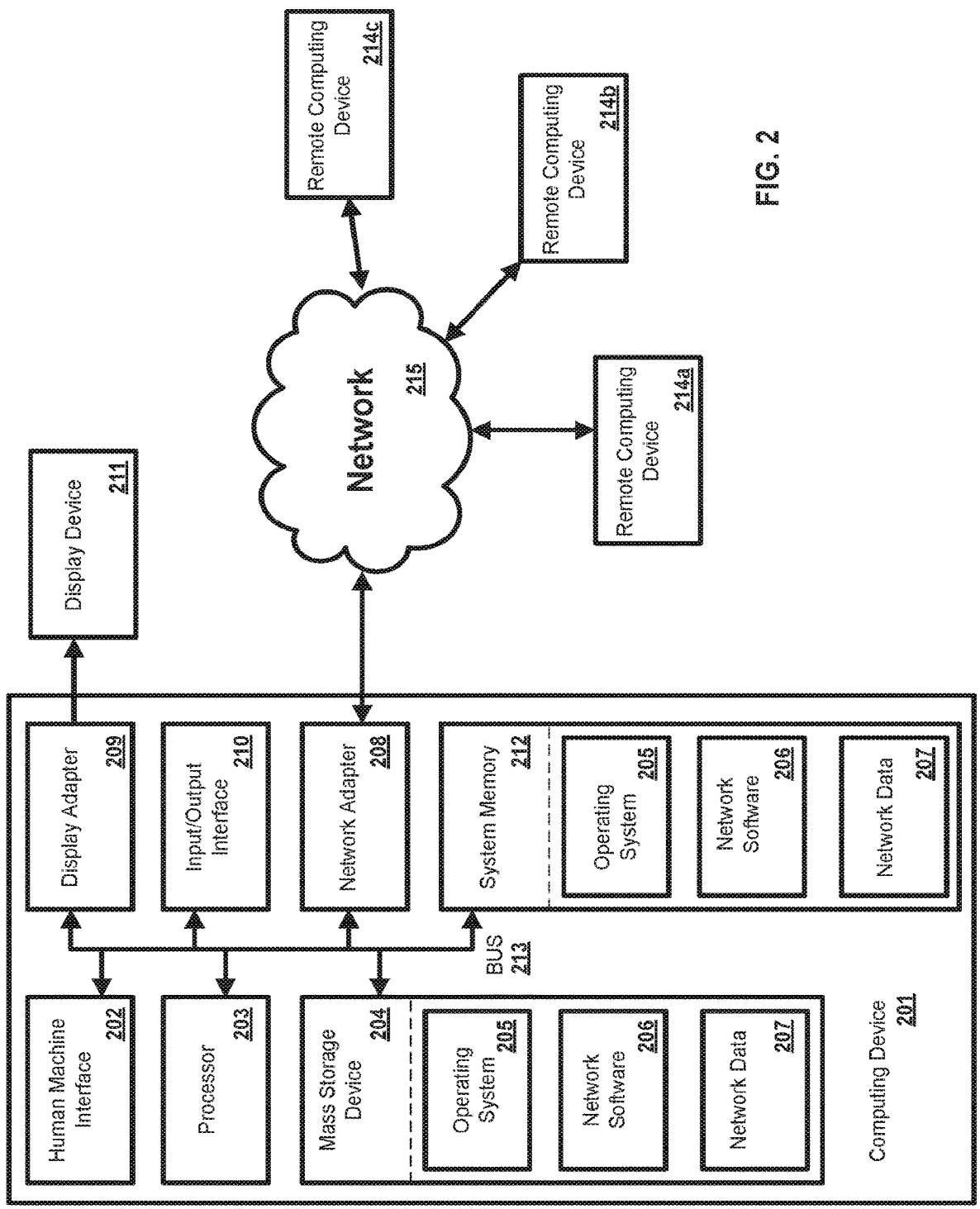
FIG. 2 is a block diagram of an exemplary computing device.

In an exemplary aspect, the methods and systems can be implemented on a computing system such as computing device 201 as illustrated in FIG. 2 and described below. By way of example, one or more of the user device 102 and the computing device 104 of FIG. 1 can be a computer as illustrated in FIG. 2. Similarly, the methods and systems disclosed can utilize one or more computers to perform one or more functions in one or more locations. FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 201. The components of the computing device 201 can comprise, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, network software 206, network data 207, a network adapter 208, system memory 212, an Input/Output Interface 210, a display adapter 209, a display device 211, and a human machine interface 202, can be contained within one or more remote computing devices 214*a,b,c* at physically separate locations, connected through buses of this form, in effect implementing a fully distributed system.

The computing device 201 typically comprises a variety of computer readable media. Exemplary readable media can be any available media that is accessible by the computing device 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as network data 207 and/or program modules such as operating system 205 and network software 206 that are immediately accessible to and/or are presently operated on by the processing unit 203.

In another aspect, the computing device 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computing device 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and network software

206. Each of the operating system 205 and network software 206 (or some combination thereof) can comprise elements of the programming and the network software 206. Network data 207 can also be stored on the mass storage device 204. Network data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 201 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computing device 201 can have more than one display adapter 209 and the computer 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computing device 201 via Input/Output Interface 210. Any step and/or result of the methods can be output in any form to an output device. Such output can be any form of visual representation, including, but not limited to, textual, graphical, animation, audio, tactile, and the like. The display 211 and computing device 201 can be part of one device, or separate devices.

The computing device 201 can operate in a networked environment using logical connections to one or more remote computing devices 214a,b,c. By way of example, a remote computing device can be a personal computer, portable computer, a smart phone, a server, a router, a network computer, a peer device or other common network node, and so on. Logical connections between the computing device 201 and a remote computing device 214a,b,c can be made via a network 215, such as a local area network (LAN) and a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of network software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

Figure 3:
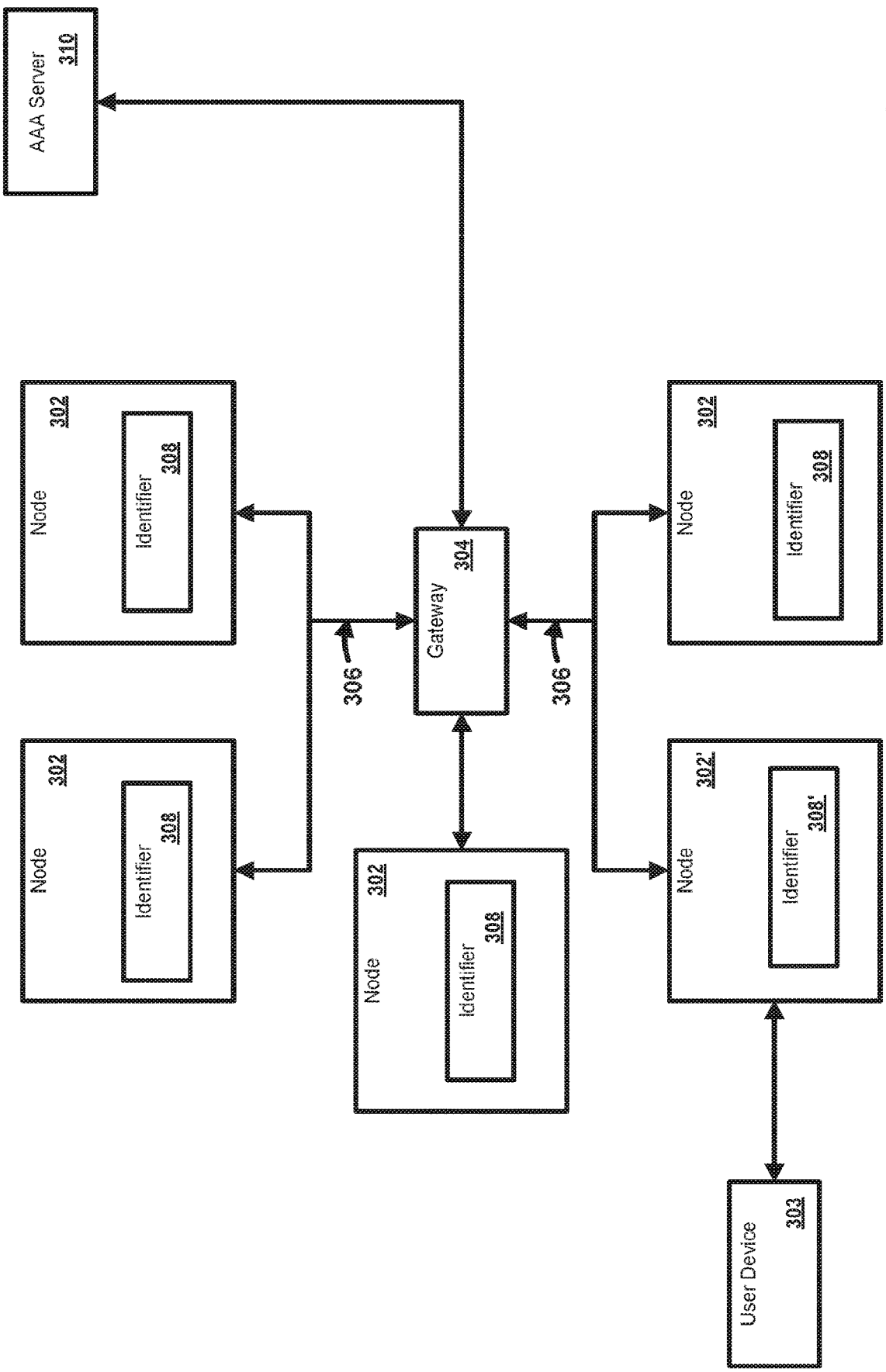
FIG. 3 is a diagram of an exemplary system and network.
Figure 4:
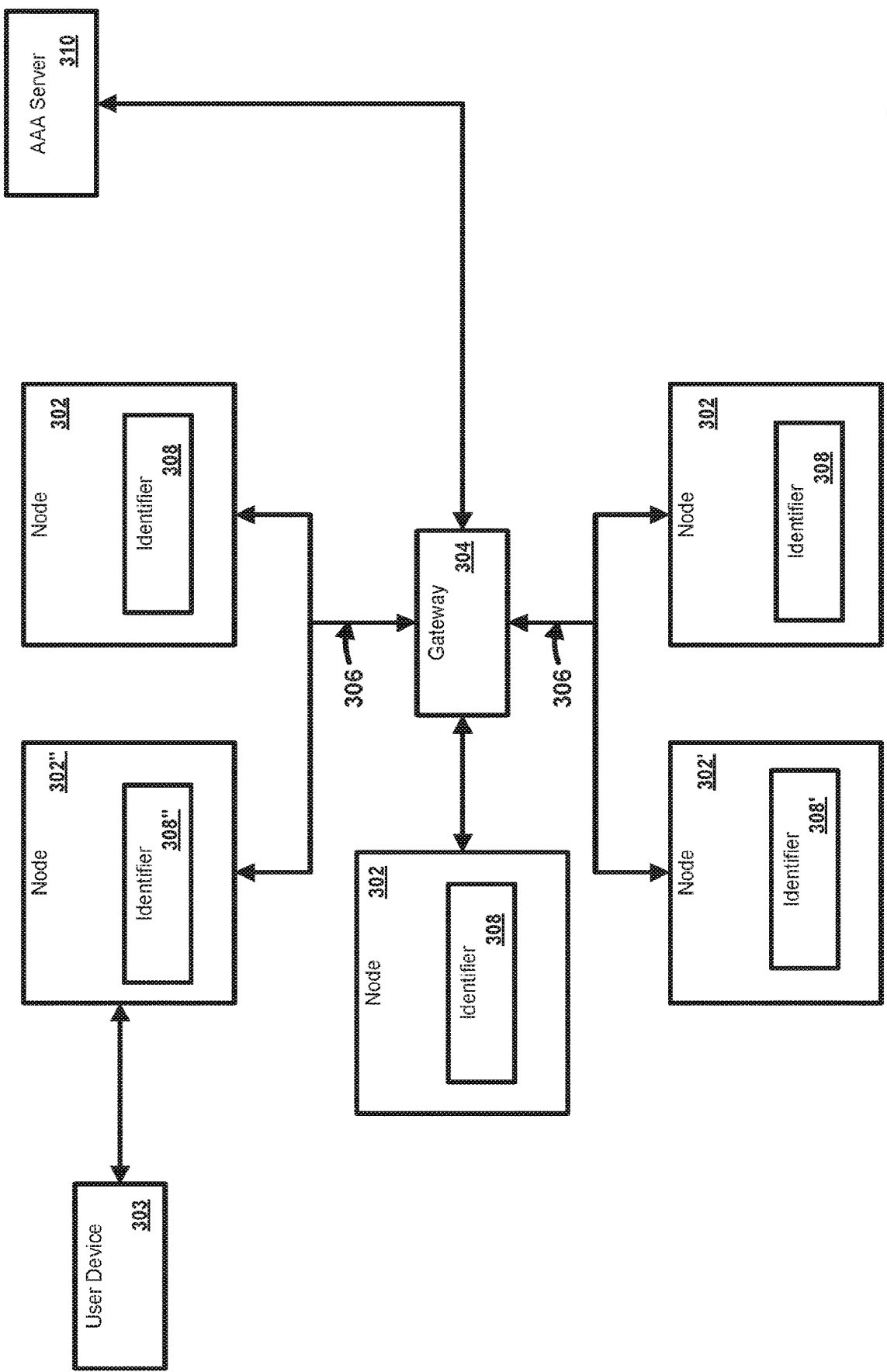
FIG. 4 is a diagram of an exemplary system and network.

FIGS. 3-4 illustrate an exemplary system and network. In an aspect, a plurality of nodes 302 can be in communication with one or more user devices 303 and one or more computing devices 304. As an example, one or more nodes can be a network access point, router, switch, communication device, or the like. As another example, one or more user devices 303 can be an electronic device such as a computer, a smartphone, a laptop, a tablet, a set top box, a display device, or other device capable of communicating with one or more of the nodes 302 of the network. As a further example, one or more of the computing devices 304 can be a gateway, router, switch, communication device terminal server, cable modem termination system, and the like.

In an aspect, one or more of the nodes 302 can be configured to communicate with another of the nodes 302 and/or one or more of the computing devices 304 via one or more communication paths 306. In an aspect, the one or more communication paths 306 can comprise one or more uninterrupted communication links, sequential links, predefined paths or links, and/or intervening nodes. Links can comprise a single point to point connection between two devices or access points. Paths can comprise one or more links. As an example, one or more of the communication paths can comprise one or more of the nodes 302. As a further example, one or more of the nodes 302 can be configured as a mesh network. In an aspect, one ore more of the communication paths 306 can be configured to transmit one or more services.

In an aspect, one or more of the nodes 302 can comprise an identifier 308. As an example, one or more identifiers can be a media access control address (MAC address). Any uniquely identifiable attribute that can be linked to a location can be used as the identifier 308. Such attributes can comprise one or more of an IP Address, serial number, latitude/longitude, geo-encoding, custom assigned unique identifier, global unique identifier (GUID), and the like. As a further example, one or more identifiers 308 can be a unique identifier for facilitating communications on the physical network segment. In an aspect, each of the nodes 302 can comprise a distinct identifier 308. As an example, the identifiers 308 can be associated with a physical location of the nodes 302.

In an aspect, an AAA server 310 can be in communication with the computing device 304. The AAA server 310 can comprise security architecture for the network of nodes 302 or other distributed systems. As an example, the AAA server 310 can control which user devices (e.g., user device 303) are allowed access to which services. As a further example, the AAA server 310 can control the resources available to the network of nodes 302. In an aspect, the AAA server 310 can communicate via one or more network protocols such as the RADIUS protocol or the Diameter protocol, for example.

As shown in FIG. 3, when the user device 303 connects to a first node 302' of the network of nodes 302, a first identifier 308' associated with the first node 302' can be detected. In an aspect, the first identifier 308' can be detected using dynamic host configuration protocol (DHCP). As an example, a DHCP discover option (e.g., option 82) can be used to transmit the first identifier 308' to the gateway 304. As a further example, a DHCP option can be used to allocate address elements such as IP addresses to the user device.

As shown in FIG. 4, when the user device 303 moves from the first node 302' and connects to a second node 302" of the network of nodes 302, a second identifier 308" associated with the second node 302" can be detected. In an aspect, data transfer between the user device 303 and the second node 302" can define a triggering event. As an example, the second identifier 308" can be transmitted to a routing device such as the network gateway 304. As a further example, the second identifier 308" can be transmitted in response to the triggering event. In an aspect, the second identifier 308" can be encapsulated for transmission such as by GRE encapsulation. In an aspect, the user device 303 may not be required to issue a DHCP request when the user device 303 connects to another node 302 having the same SSID. In particular, the user device 302 operates substantially as if it is part of the same layer 2 network. Accordingly, since a DHCP request is not required, the current IP address assigned to the user device 303 should still be valid on the network. As an example, the second identifier can be transmitted to a management device such as an AAA server 310. As a further example, the management device can be configured to control an operation of one or more of the second node 302" and the gateway 304 in response to the identifier.

Figure 5:
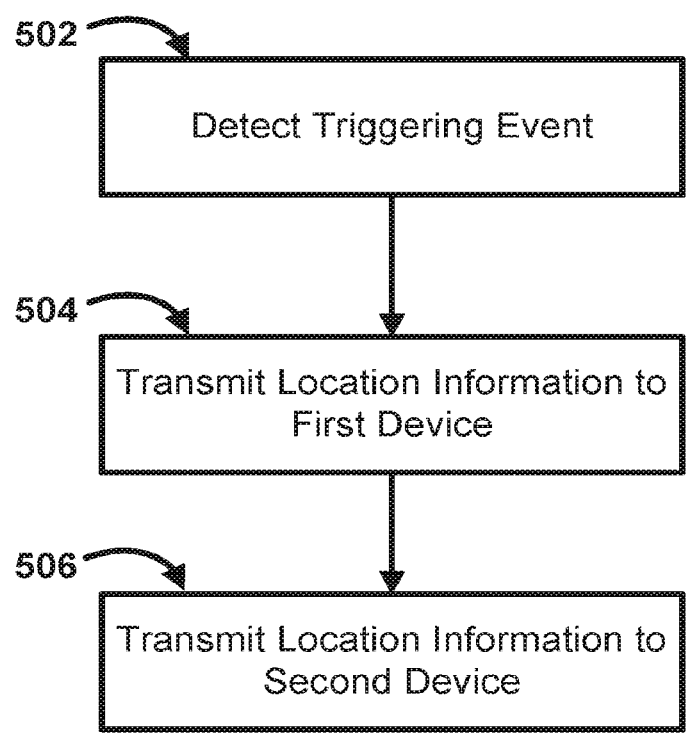
FIG. 5 is a flow chart of an exemplary method.

In an aspect, provided are methods for managing location information in a network. An exemplary method is shown in FIG. 5. The method illustrated in FIG. 5 will be discussed, for example only, in reference to FIGS. 1-4. In step 502, a triggering event can be detected. In an aspect, the triggering event can be detected at one or more nodes 302 (FIGS. 3-4). As an example, the triggering event can comprise receiving data at one or more nodes 302. As a further example, the triggering event can comprise a communication between one or more nodes 302 and a connected device (e.g., user device 303 or a client).

In step 504, location information can be transmitted to a routing device such as gateway 304 (FIGS. 3-4). In an aspect, the location information can be associated with one or more nodes 302. As an example, the location information can be transmitted in response to the triggering event of step 502. As a further example, the location information can comprise an identifier such as a MAC address associated with one of the nodes 302. In an aspect, the location information can be encapsulated (e.g., GRE encapsulation) for transmission. As an example, the location information can be encapsulated using one or more of an internet control messaging protocol, address resolution protocol, and connectivity fault management protocol. Other protocols and encapsulation can be used.

In step 506, the location information can be transmitted to a management device such as the AAA server 310 (FIGS. 3-4). In an aspect, the management device can be configured to control an operation of one or more of the nodes and the routing device in response to the location information. In an aspect, transmitting location information or identifiers to a management device is executed by the routing device.

Figure 6:
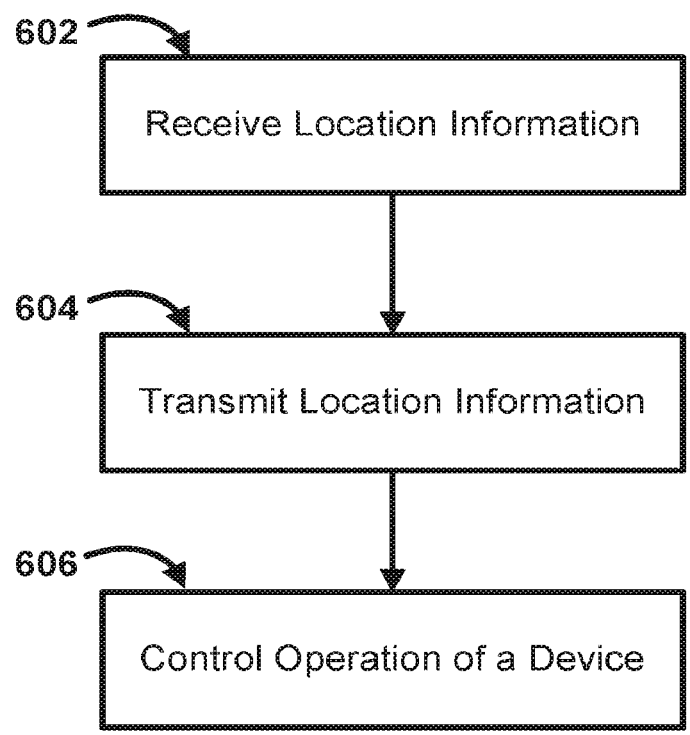
FIG. 6 is a flow chart of an exemplary method.

In an aspect, provided are methods for managing location information in a network. An exemplary method is shown in FIG. 6. The method illustrated in FIG. 6 will be discussed, for example only, in reference to FIGS. 1-4. In step 602, location information can be received, for example, at a routing device such as gateway 304 (FIGS. 3-4). In an aspect, the location information can be associated with one or more nodes 302. As an example, the location information can be transmitted in response to the triggering event of step 502. As a further example, the location information can comprise an identifier such as a MAC address associated with one of the nodes 302. In an aspect, the location information can be encapsulated (e.g., GRE encapsulation) for transmission. As an example, the location information can be encapsulated using one or more of an internet control messaging protocol, address resolution protocol, and connectivity fault management protocol. Other protocols and encapsulation can be used.

In step 604, the location information can be transmitted to a management device such as the AAA server 310 (FIGS. 3-4). As an example, the routing device can transmit the location information to the management device. As a further example, the location information can be transmitted to the management device in an unencapsulated format. In an aspect, the management device can be configured to control an operation of one or more of the nodes and the routing device in response to the location information. In an aspect, transmitting location information or identifiers to a management device is executed by the routing device.

In step 606, the management device can control the operation of one or more of the routing device, a node, and/or a user device based on the location information. In an aspect, controlling one or more of the routing device, a node, and/or a user device can comprise provisioning the same.

Figure 7:
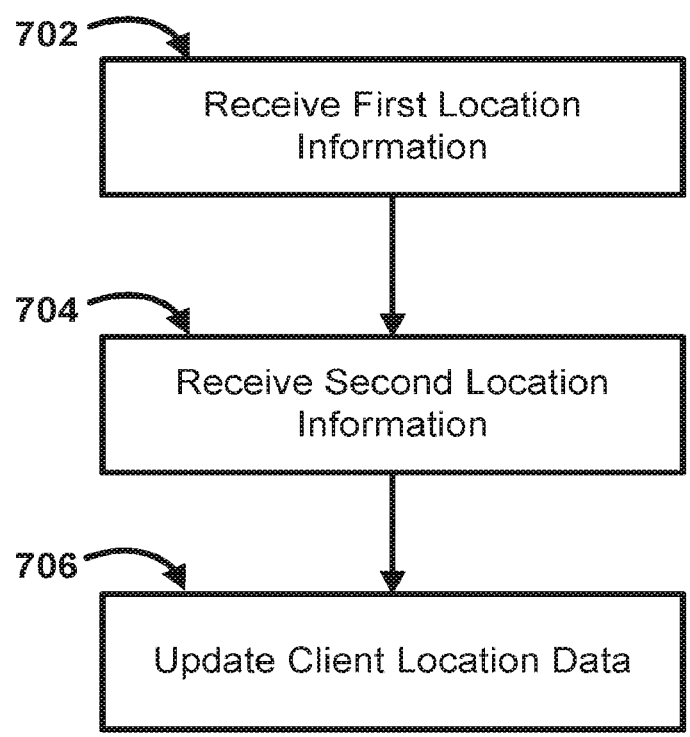
FIG. 7 is a flow chart of an exemplary method.

In an aspect, FIG. 7 illustrates an exemplary method for managing a network. The method illustrated in FIG. 7 will be discussed, for example only, in reference to FIGS. 1-4. In step 702, first location information can be received. In an aspect, the first location information can comprise an identifier such as a MAC address. As an example, the first location information can be received from and/or related to one or more nodes of a network. As a further example, the location information can be received based upon a user communication with a first node of a network.

In step 704, second location information can be received. In an aspect, the second location information can comprise an identifier such as a MAC address. As an example, the second location information can be received from and/or related to one or more nodes of a network. As a further example, the location information can be received based upon a user communication with a second node of a network. In an aspect, the second location information can be received in an encapsulated format. As an example, the second location information can be encapsulated using generic routing encapsulation. As a further example, the second location information can be encapsulated using one or more of internet control messaging protocol, address resolution protocol, and connectivity fault management protocol.

In step 706, a client location data can be stored or updated. In an aspect, the client location data can comprise one or more of the first location information and the second location information. As an example, the client location data can be updated based on one or more of the first location information and the second location information. As a further example, the AAA server can store and/or update the location value in a network session state for the located user device when the user device moves between access points on the network. In an aspect, session schema can comprise contain date/time, calling station identifier, called station identifier, Internet Protocol (IP) Address IPV4/IPV6, account, or other data points.

In an aspect, location awareness of user devices connected to a network (e.g., a wireless LAN, open WiFi network, or the like) can facilitate providing co-branded login pages, user interfaces or advertisements specific to the AP location through which one or more user devices are connected to the network. As an example, services/features can be provided at specific locations (e.g. amenity or guest services) and to specific user devices connected at those locations. As a further example, understanding traffic demographics can assist in targeting and developing future AP deployments for the network. In an aspect, policies such as WiFi Channel, WiFi Band (2.4 or 5 GHZ) or SSID Steering or Preference can be supplied based upon knowledge of client device identity at a given access point or node location to help provide optimal service. As an example, home users to can be steered to a private SSID when they are at their home location.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A system comprising:
a computing device configured to:
receive, based on a first communication between a first access point and a user device, a first identifier of the first access point, wherein the first identifier is associated with a location of the first access point;
receive, based on a second communication between a second access point and the user device, a second identifier of the second access point, wherein the second identifier is associated with a location of the second access point, and wherein the second identifier is received in a layer 2 frame, wherein the layer 2 frame is encapsulated, based on generic routing encapsulation, in a layer 3 packet by the second access point;
determine, based on the second identifier, location data associated with the user device;
cause, based on the location data, one or more portions of targeted content to be sent to the user device;
wherein the first access point is configured to:
receive the first communication from the user device, and
send, based on the first communication, the first identifier of the first access point; and
wherein the second access point is configured to:
receive the second communication from the user device, and
send, based on the second communication, the second identifier of the second access point.

2. The system of claim 1, wherein the second identifier is encapsulated in the layer 2 frame using one or more of interne control messaging protocol, address resolution protocol, or connectivity fault management protocol.

3. The system of claim 1, wherein the computing device is further configured to send, to a management device, the second identifier, wherein the management device comprises one or more of an authentication element, an authorization element, or an accounting element.

4. The system of claim 1, wherein to cause the one or more portions of targeted content to be sent to the user device, the computing device is configured to cause a management device to send the one or more portions of targeted content.

5. An apparatus comprising:
one or more processors; and
memory storing processor executable instructions that, when executed by the one or more processors, cause the apparatus to:
receive, based on a first communication between a first access point and a user device, a first identifier of the first access point, wherein the first identifier is associated with a location of the first access point;
receive, based on a second communication between a second access point and the user device, a second identifier of the second access point, wherein the second identifier is associated with a location of the second access point, and wherein the second identifier is received in a layer 2 frame, wherein the layer 2 frame is encapsulated, based on generic routing encapsulation, in a layer 3 packet by the second access point;
determine, based on the second identifier, location data associated with the user device; and
cause, based on the location data, one or more portions of targeted content to be sent to the user device.

6. The apparatus of claim 5, wherein the second identifier is encapsulated in the layer 2 frame using one or more of internet control messaging protocol, address resolution protocol, or connectivity fault management protocol.

7. The apparatus of claim 5, wherein the processor executable instructions, when executed by the one or more processors, further cause the apparatus to send, to a management device, the second identifier, wherein the management device comprises one or more of an authentication element, an authorization element, or an accounting element.

8. The apparatus of claim 5, wherein the processor executable instructions that, when executed by the one or more processors, cause the one or more portions of targeted content to be sent to the user device, cause the apparatus to cause the one or more portions of targeted content to be sent to the user device by causing a management device to send the one or more portions of targeted content.

9. A system comprising:
a computing device configured to:
   determine, based on a first identifier of a first access point, a location of a user device, wherein the first identifier is associated with a location of the first access point;
   receive, based on a first communication between a second access point and the user device, a second identifier of the second access point, wherein the second identifier is associated with a location of the second access point, and wherein the second identifier is received in a layer 2 frame, wherein the layer 2 frame is encapsulated, based on generic routing encapsulation, in a layer 3 packet by the second access point;
   update, based on the second identifier, the location of the user device;
wherein the first access point is configured to:
   receive the first communication from the user device, and
   send, based on the first communication, the first identifier of the first access point; and
wherein the second access point is configured to:
   receive a second communication from the user device, and
   send, based on the second communication, the second identifier of the second access point.

10. The system of claim 9, wherein the first identifier is received based on a communication between the first access point and the user device.

11. The system of claim 9, wherein the second identifier is encapsulated in the layer 2 frame using one or more of interne control messaging protocol, address resolution protocol, or connectivity fault management protocol.

12. The system of claim 9, wherein the computing device is further configured to send, to a management device, the second identifier, wherein the management device comprises one or more of an authentication element, an authorization element, or an accounting element.

13. The system of claim 9, wherein the computing device is further configured to cause, based on the updated location of the user device, one or more portions of targeted content to be sent to the user device.

14. The system of claim 13, wherein to cause the one or more portions of targeted content to be sent to the user device, the computing device is configured to cause a management device to send the one or more portions of targeted content.

15. An apparatus comprising:
one or more processors; and
memory storing processor executable instructions that, when executed by the one or more processors, cause the apparatus to:
   determine, based on a first identifier of a first access point, a location of a user device, wherein the first identifier is associated with a location of the first access point;
   receive, based on a communication between a second access point and the user device, a second identifier of the second access point, wherein the second identifier is associated with a location of the second access point, and wherein the second identifier is received in a layer 2 frame, wherein the layer 2 frame is encapsulated, based on generic routing encapsulation, in a layer 3 packet by the second access point; and
   update, based on the second identifier, the location of the user device.

16. The apparatus of claim 15, wherein the first identifier is received based on a communication between the first access point and the user device.

17. The apparatus of claim 15, wherein the second identifier is encapsulated in the layer 2 frame using one or more of interne control messaging protocol, address resolution protocol, or connectivity fault management protocol.

18. The apparatus of claim 15, wherein the processor executable instructions, when executed by the one or more processors, further cause the apparatus to send, to a management device, the second identifier, wherein the management device comprises one or more of an authentication element, an authorization element, or an accounting element.

19. The apparatus of claim 15, wherein the processor executable instructions, when executed by the one or more processors, further cause the apparatus to cause, based on the updated location of the user device, one or more portions of targeted content to be sent to the user device.

20. The apparatus of claim 19, wherein the processor executable instructions that when executed by the one or more processors, cause the one or more portions of targeted content to be sent to the user device, cause the one or more portions of targeted content to be sent to the user device by causing a management device to send the one or more portions of targeted content.

* * * * *